United States Patent Office 2,801,524
Patented Aug. 6, 1957

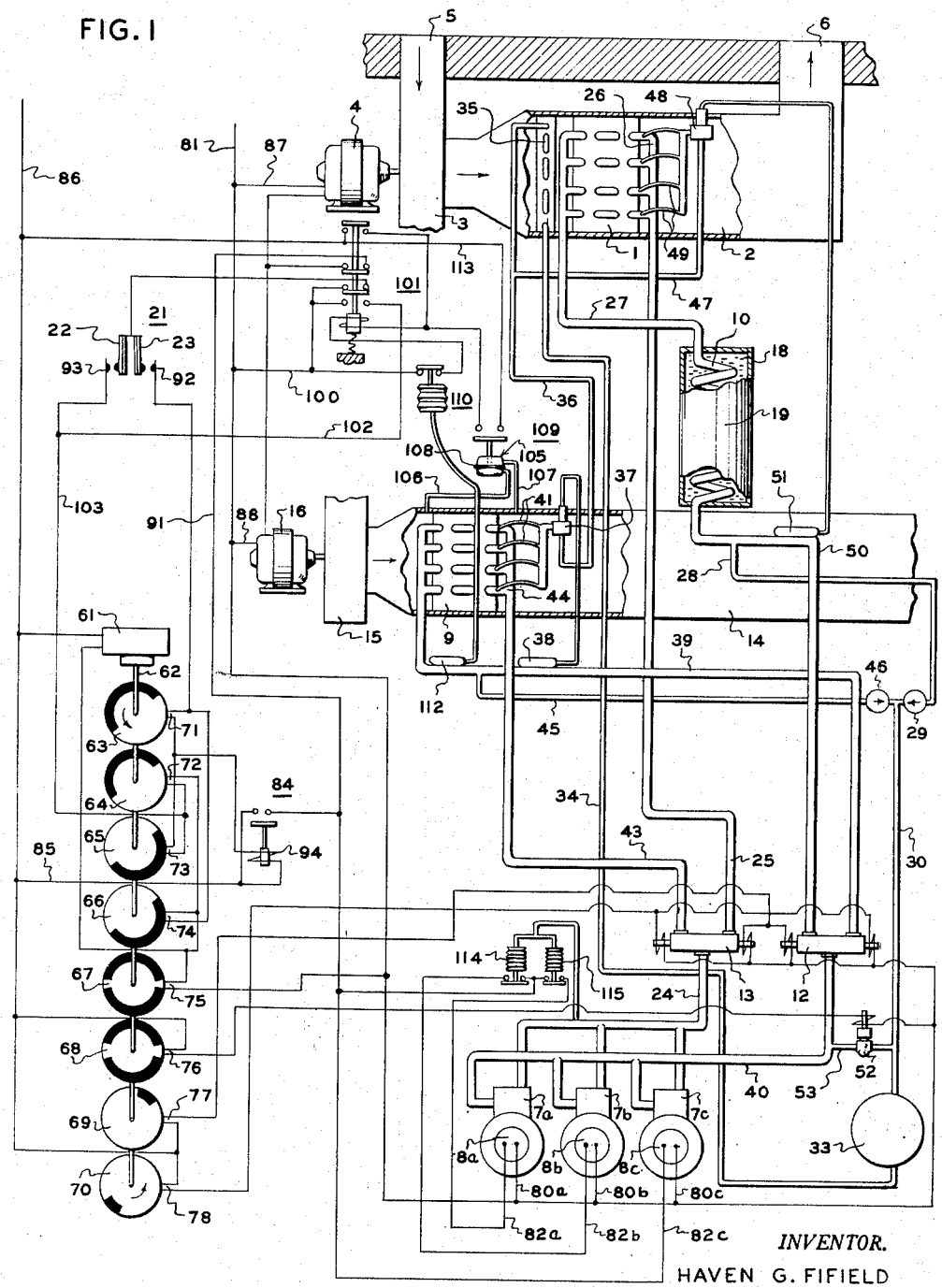

2,801,524

HEAT PUMP INCLUDING HOT GAS DEFROSTING MEANS

Haven G. Fifield, Upper Montclair, N. J., assignor to General Electric Company, a corporation of New York Application July 22, 1954, Serial No. 445,088

9 Claims. (Cl. 62—4)

The present invention relates to a heat pump including hot gas defrosting means and particularly to a heat pump including heat storage means for storing and supplying a substantial portion of the heat necessary for hot gas defrosting purposes.

A heat pump is essentially a reverse cycle refrigeration system employed for cooling a dwelling or other structure in the summer and the heating thereof during the colder months. It essentially comprises a reversible refrigeration system including an indoor heat exchanger, a compressor and means for conducting compressed refrigerant through the system so that the indoor heat exchanger functions as a refrigerant condenser during the heating season and as an evaporator during the cooling season. For example, during the heating season, the refrigerant passing through the outdoor heat exchanger or evaporator abstracts heat from the outdoor air and the vaporized refrigerant after being compressed is conducted to the indoor exchanger or condenser where the heat received from the outdoor air heats the air passing over the indoor heat exchanger.

During the heating cycle operation under certain climatic conditions, considerable frost collects on the outdoor heat exchanger or evaporator which of course must operate at a substantially lower temperature than the surrounding air from which heat is being extracted. This insulating layer of frost reduces the efficiency of the evaporator to such an extent that it is necessary to provide means for periodically removing the frost accumulation.

A convenient method of defrosting the outdoor exchanger comprises reversing the flow of refrigerant through the heat pump for a limited period so that hot gaseous refrigerant from the compressor introduced into the outdoor exchanger warms this exchanger sufficiently to melt the frost accumulated thereon. During this reverse cycle defrosting, heat is extracted from the space being conditioned by the indoor coil operating as an evaporator and this heat, together with a certain amount of compression heat, is supplied to the outside exchanger. One disadvantage of this method is that if the thermal flywheel effect of the indoor space being conditioned is insufficient to carry over during the defrosting when heat is being extracted from rather than introduced into the space by the indoor heat exchanger, drafty and uncomfortable conditions may result during and immediately following the defrosting period.

A primary object of the present invention is to provide a heat pump including an improved, low cost arrangement for employing heat storage means to supply heat for defrosting the outdoor heat exchanger.

A further object of the invention is to provide in combination with a heat pump, an efficient and reliable arrangement for automatically storing heat for evaporator defrosting purposes which arrangement will not interfere with the normal operation of the heat pump.

A further object of the invention is to provide a heat pump comprising an improved reverse cycle refrigeration system including heat storage means and means for automatically controlling the operation of the system both during the normal heating and cooling cycles and also during defrost operation.

Further objects and advantages of this invention will become apparent as the following description proceeds and the features of novelty which characterize the invention will be pointed out with particularity in the claims annexed to and forming part of this specification.

In carrying out this invention, there is employed a heat pump including a reverse cycle refrigeration system comprising a refrigerant compressor, an indoor heat exchanger, an outdoor heat exchanger, and a heat transfer coil in heat exchange relationship with a heat storage medium. For operation of the system on the heating cycle with the indoor exchanger functioning as a refrigerant condenser and the outdoor exchanger as the evaporator, refrigerant circulating means are provided for connecting the compressor, the two heat exchangers and the heat transfer coil in closed series connection for flow of refrigerant from the compressor through the indoor exchanger, the heat transfer coil, the outdoor exchanger and back to the compressor. For operation on the cooling cycle or during defrosting, means are provided for connecting the compressor, the outdoor heat exchanger, the indoor heat exchanger and the heat transfer coil in closed series connection so that the flow of refrigerant through the system is such that heat stored in the heat storage medium during operation of the system on the heating cycle will be given up to the refrigerant passing through the heat transfer coil and carried by the refrigerant directly through the compressor to the outdoor exchanger for defrosting purposes. In a preferred form, the invention also includes control means for both automatically providing year around control of and reversal of the system in response to the load demand and defrost control means for operation of the system on a defrost cycle independent of the load responsive control means.

For a better understanding of the invention reference may be had to the accompanying drawing in which the single figure is a diagrammatic illustration of a heat pump installation including a reverse cycle refrigeration system embodying my invention.

Referring now to the drawing, the heat pump system illustrated comprises a reverse cycle refrigeration system which includes an indoor heat exchanger or coil 1 arranged in a duct 2 through which air to be conditioned is circulated by a blower 3 driven by a motor 4, return air being admitted to the duct 2 through an inlet 5 and conditioned air being returned through an outlet 6 to the room or other space being conditioned. The heat transfer unit 1 may be connected either as the evaporator or the condenser of a refrigerating system or heat pump so that the air in the duct 2 may be either heated or cooled as desired. The heat pump preferably, but not necessarily, includes a refrigerant compressor means of the variable output type which is shown for the purposes of illustrating the present invention as comprising three separate compressors 7a, 7b and 7c respectively driven by electric motors 8a, 8b and 8c.

In the modification illustrated, the three compressors are connected in parallel and this compressor means in combination with an outdoor heat exchanger or coil 9, the indoor coil 1 and a heat transfer coil 10 form the essential elements of a closed refrigerant circuit provided with three-way solenoid operated, reversing or switchover valves 12 and 13 for directing the flow of refrigerant through the system during the heating or the cooling or defrosting operations. The outdoor coil 9 is arranged in an outdoor air duct 14 adapted to circulate outdoor air by means of blower 15 driven by a motor 16 over the outdoor coil 9 and return it to the outside of the structure through suitable duct connections (not shown).

The heat transfer coil 10 is arranged in heat exchange relationship with a heat storage medium 18 such as a body of water contained in a storage tank 19. During the operation of the heat pump on the heating cycle, heat from the warm refrigerant passing through coil 10 is absorbed by and stored in the heat storage medium 18 for use in defrosting the outdoor coil 9 when necessary.

The operation of the heat pump is controlled by a thermal switch in the form of a thermostat 21 comprising bimetallic elements 22 and 23 forming part of an electrical control system for automatically changing over the operation of the heat pump from heating to cooling or vice versa. When the system is operating with the coil 1 as a condenser and the coil 9 as an evaporator for heating purposes during the winter, hot compressed refrigerant is delivered by the compressor means through a discharge line 24 to the fluid inlet connection of the three-way valve 13 which directs the flow through a conduit 25 to the unit 1 through the header 26. The refrigerant in the coil 1 is partially or completely condensed by heat exchange with the air circulated through the duct 2. From coil 1, the refrigerant flows through a line 27 to the heat transfer coil 10 where some of the remaining heat contained in the high pressure refrigerant is transmitted to the heat storage medium 18. From coil 10 the condensed refrigerant passes through line 28, check valve 19 and line 30 to a liquid receiver 33.

Liquid refrigerant then flows through a liquid line 34 to a subcooler coil 35 positioned in duct 2 ahead of the indoor coil 1 where a large part of the heat remaining in the high pressure refrigerant is given up to the air stream passing through duct 2 before the air passes over indoor coil 1. The amount of heat available in the refrigerant at this point will depend upon the amount of heat absorbed by the heat storage medium 18. When the storage capacity of the storage medium 18 is exhausted, that is when its temperature is equal to the temperature of the refrigerant passing through coil 10, the heat liberated to the air passing through subcooler coil 35 will be sufficient to raise the air temperature at least a few degrees.

The liquid refrigerant leaving subcooler coil 35 passes through line 36, the thermostatic expansion valve 37 to the coil 9 through distributor tubes 41. As coil 9 is operating as an evaporator during the heating cycle operation of the system, heat is absorbed by the refrigerant from the outdoor air passing through duct 14. The valve 37 is provided with a feeler bulb 38 in heat exchange with the outlet conduit 39 of the unit 9 and operates in the usual manner to maintain a predetermined amount of superheat of the refrigerant discharged from the coil 9. The vaporized refrigerant then flows through the outlet conduit 39 to the fluid inlet connection in the three-way valve 12 and hence through the fluid outlet to a suction or intake conduit 40 of the compressor means.

When the system is reversed for summer operation the positions of valves 12 and 13 are reversed so that the coil 1 functions as an evaporator. Hot gas discharged from the compressor flows through the valve 13 and out a fluid outlet connected to a conduit 43 and to the coil 9 through header 44. In coil 9, it is condensed and liquefied and the liquid refrigerant flows through the outlet conduit 45 and hence through a check valve 46 and line 30 to the liquid receiver 33. The liquid refrigerant flows from the receiver through the liquid line 34, the subcooler coil 35 and line 47 to a thermostatic expansion valve 48, the valve 37 closing to prevent passage of refrigerant through conduits 36 and 43. Theoretically there is no advantage or disadvantage in passing the refrigerant through the subcooler located in duct 2 during the cooling operation, since the heat liberated from the refrigerant in the subcooler is almost exactly offset by the increased cooling capacity of the refrigerant as it goes through coil 1. There is, however, a practical advantage in using the subcooler on cooling. As an expansion valve will not pass as much gas as liquid, any evaporation of the refrigerant before it reaches the expansion valve 48 would cause the valve to act as if it were undersized. By sending the refrigerant through the subcooler, any chance of the refrigerant flashing before it enters the valve 48 is prevented.

From the valve 48, the liquid refrigerant passes through distribution tubes 49 to the coil 1 where it is evaporated by heat exchange with the air flowing through the duct 2. The vaporized refrigerant returns through the conduit 27, coil 10, line 50, inlet connection of valve 12, and conduit 40 to the compressor. The superheat of the refrigerant returning to the compressor is controlled by the expansion valve 48 which is provided with a thermal feeler bulb 51 in heat exchange relationship with the line 50 near the outlet of coil 10. Thus during operation on the cooling cycle, the expansion valve 48 is controlled by the temperature of the refrigerant leaving coil 10 to maintain the desired degree of superheat in the refrigerant returning to the compressor through line 50.

For balancing the pressure within the system before initiating a change over from the heating cycle to the cooling cycle or vice versa, there is provided a solenoid operated unloading valve 52 in a conduit 53 connecting the suction or low pressure side of the system to the head or high pressure side. This conduit 53 is shown as connecting the conduit 40 to the conduit 30 between the check valves 29 and 46 and the receiver 33.

The operation of the system on the heating or cooling cycles is controlled electrically by normal control circuits energized in accordance with the movement of bimetallic strips 22 and 23 of the thermostat 21. In addition to the thermostat, the electrical control system includes a plurality of motorized switches collectively operated by a nonreversing timer motor and so arranged that upon a call by the thermostat for the same operating cycle, the operation of the refrigerating system will be under control of only the thermostat without requiring any operation of the timer motor. On the other hand if the thermostat calls for the opposite cycle, the control system is designed to energize the timer motor so that the various motorized switches operate in the desired sequence to effect the proper change over of the system for operation on the opposite cycle.

This motorized switching mechanism includes a nonreversible motor 61 and a shaft 62 connecting the motor to a drum contactor including a plurality of switch plates 63 to 70 inclusive which are formed of insulating material and have conducting contact sectors of different sizes thereon. Each of the plates forming the drum contactor have cooperating brushes or contactors indicated by numerals 71 to 78 inclusive which together with the contact sectors on the plates 62 to 70 inclusive form motor operated switches or switching means for controlling various parts of the refrigerating system. In the following description these motor operated or motorized switches will be referred to using the same reference numerals employed in designating the plates forming the switching mechanism thereof.

The energizing circuit for the compressor motors 8a, 8b and 8c includes leads 80a, 80b and 80c from supply line 81, return leads 82a, 82b and 82c, relay switch 84 and lead 85 connected to the second supply line 86. The fan motors 4 and 16 are energized by circuits including leads 87 and 88, return lead 91, switch 84 and lead 85 connected to supply line 86.

The change-over valves 12 and 13 are controlled by circuits which include motorized switches 69 and 70. Each of these valves are solenoid operated. Each of the change-over valves are provided with two solenoids, the energization of one being under control of switch 69 for shifting the valve to a heating position and the energization of the other being under control of switch 70 for shifting to a cooling position. The unloading valve control circuit is energized by switch 68. The unloading valve is normally biased to a closed position and is opened only upon closing of switch 68.

With the switches 68, 69 and 70 controlling the energizing circuits for these valves, their operation in turn is controlled by the switch motor 61. The switch motor 61 is connected to the supply lines 81 and 86 by a plurality of separate circuits each of which includes one of the motorized switches driven by the motor 61. Two of these circuits include one or the other of the thermal switches 22 and 23 operated by thermostat 21. The other circuit includes motorized switch 67, the purpose of this circuit being to assure operation of the timer motor 61 during certain periods when it is not connected to either of the circuits including a thermal switch. The two circuits including a thermal switch may be respectively referred to as heating and cooling circuits. The heating circuit includes bimetal strip 23 of thermostat 21 forming a heating cycle thermostat which upon a call for heat moves to the right to engage a contact 92 whereupon the motor 61 is under control of the switch 66. The cooling circuit on the other hand comprises bimetal 22 forming a cooling cycle thermostat, contact 93 and the motorized switch 64.

Parts of these last two circuits are also employed to control the operation of the compressor means by operation of relay switch 84. More specifically the heating circuit, which is under the control of the thermal switch comprising bimetal strip 23 and contact 92, also energizes solenoid coil 94 which actuates relay 84 while closure of the thermal switch comprising bimetal 22 and contact 93 in the cooling circuit places the coil 94 under control of the switch 65. In the heating circuit the coil 94 is under control of the motorized switch 63 when the thermal switch is closed. It will be evident from a consideration of the various drum switches 62 to 70 that the contact or conducting areas are of different circumferential lengths and arranged at different positions relative to one another on the various switch plates. The size or relative length of the contact areas and their angular positions on the various plates determining the sequential operation of the timer motor, compressor and the various valves. It will be understood of course that in place of the drum contactor type of switch, cam operated switches designed to effect the same switching operations could be employed in which case a single cam may be arranged to operate more than one switch.

With the motorized switch in the position shown in the drawing, the reversible refrigeration system has just completed a cooling cycle in which the indoor heat exchanger 1 has functioned as an evaporator. All of the motorized switches excepting 65 and 66 are open so that upon a call by the thermostat 21 for the same operation, that is, another cooling cycle by movement of the bimetal strip 22 to the left to engage contact 93, the timer motor 61 will remain deenergized since both contacts 64 and 67 are open. The closing of the thermostat controlled switch including bimetal 22 and contact 93 will however energize solenoid 94 to close switch 84 in the power circuit for the compressor motors 8a, 8b and 8c and the fan motors 4 and 16. These motors will continue to operate until the bimetal 22 moves to the right breaking the cooling and hence the motor circuits.

When thermostat 21 calls for a changeover from a cooling cycle to a heating cycle due to change in the space temperature, the bimetal 23 moves to the right into contact with contact 92. One of the timer motor circuits is immediately completed through switch 66 which switch was left in a closed position following the previous cooling cycle. The timer motor 61 begins to rotate in a counterclockwise direction thus rotating the various switch plates of switches 62 to 70 inclusive in the same direction. At this point none of the compressor circuits are energized since the thermostatically controlled switch 22 and motorized switch 63 are open. After the timer motor 61 has rotated through a few degrees, switch 67 closes its timer motor circuit and the conducting portions of this switch are such that switch 67 remains closed until the timer motor has rotated slightly less than 180°. On continued rotation of the timer motor, switch 68 included in the unloading valve circuit is closed connecting the unloading valve solenoid across the supply lines 91 and 86. The unloading valve is thereupon opened so that the pressures on the two sides of the refrigerating system can become equalized. After a predetermined interval of time sufficient to accomplish the unloading, motorized switch 70 closes to energize solenoids of valves 12 and 13 which effect a change-over of these valves to their heating positions wherein the compressed refrigerant from the compressor means flows first to the indoor heat exchanger 1. With the unloading valve circuit and the change-over circuits still energized, switch 63 is closed thus completing the circuit including the thermostat control switch 23 and switch 63 to energize solenoid 94 of relay 84 and close the power circuits to the compressor and fan motors.

During the period of time the timer motor 61 was under control of the circuit including switch 67, the switches 65 and 66, which were closed during the cooling cycle, are opened. After these switches are opened and while the timer motor is still under the control of switch 67, switch 64 is closed. The closing of switch 64 has no effect upon the operation of the system at this time but merely prepares the control system for future operation of the timer motor in the event the thermostat requires a change back to the cooling cycle.

Shortly before the timer motor has completed a one-half revolution of the switch mechanism, switch 67 is opened as are also switches 69 and 70 controlling the operation of the unloading valve and the change-over valves. The solenoids controlling the changeover valves and the solenoids controlling the unloading valve remain energized for a short period after the compressor motors are started by the closing of switch 63 to permit the building up of sufficient pressure differentials within the change-over valve mechanisms to hold the valves in their new positions without the aid of the solenoids.

After rotation of the timer motor 61 through 180° to a heating cycle, the various switches are in such positions that upon a repeated call for a heating cycle, the timer motor 61 remains inoperative and only the compressor and fan motors are energized by the control circuit including the contact 92 and the closed switch 63. The remaining one half of the drum contactor switch mechanism is designed along the same lines as that half which has just been described with the various conducting areas being so arranged as to obtain a reversal of the refrigerating system from the heating cycle or position to the cooling cycle or position in the event the thermostat 21 calls for such. In effecting the change to the cooling cycle, the timer motor is energized by means of switch 67 and the unloading valve circuit is under control of switch 69. The change-over valves 12 and 13 are moved to their cooling positions by the closing of switch 69 at the proper time, that is, after the unloading operation has been substantially completed.

The particular automatic electrical control system including the timer motor driven switches as described hereinbefore is not part of the present invention but is described and claimed in the copending application Serial No. 407,045, filed January 29, 1954, now Patent No. 2,713,250 in the name of Clair W. Blatchford and assigned to the same assignee as the present invention. This automatic control system is merely illustrative of means for controlling the normal, as distinguished from the defrosting, operation of the refrigeration system of the present invention.

The above described or similar electrical system provides automatic normal operation of the refrigeration system on the heating and cooling cycles either in response to repeated calls for the same cycle of operation or for reversal of the system from one cycle to the other in response to temperatures sensed by the thermostat 21 which ordinarily is located within the dwelling or other structure served by the heat pump.

During winter operation of the heat pump on the heating cycle, it may be necessary to reverse the flow of refrigerant through the system to remove frost accumulated on the outdoor coil 9. For thus purpose, control means are provided in accordance with present invention for initiating and terminating the defrost operation of the refrigeration system independent of the setting of the thermostat 21.

In the illustrated embodiment of this invention, there is provided an additional control circuit for timer motor 61 bypassing thermostat 21. This control circuit includes line 100 connected to supply line 81, the normally open lower pair of contacts of defrost relay switch 101, leads 102 and 103, and switch 64 which controls the energization of timer motor 61 when the motor operated control system is on the cooling cycle. The energization of the defrost relay 101 is controlled in the illustrated embodiment of the invention by the increased pressure difference which develops between the up-stream and down-stream sides of the outdoor coil 9 upon the blocking or partial blocking of the air passageways in the coil due to the accumulation of frost. Means for sensing the accumulation of frost resulting in this change in pressure differential comprises a pressure sensitive element 105 including a casing and a diaphragm 108 dividing the casing into two chambers. A pipe 106 communicating with the duct 14 at a point upstream from the coil 9 is connected to the lower chamber and a pipe 107 communicating with the down-stream side of the duct is connected to the upper chamber. When the static pressure in the two chambers reaches a predetermined differential, the diaphragm 108 deflects upwardly to close the switch 109.

Closing of switch 109 completes an energizing circuit for the solenoid of relay 101, which circuit includes lead 113 from supply line 86, switch 109, the solenoid of relay 101, switch 110 and lead 100 back to supply line 81.

It will be noted that the lower and middle pairs of contacts on relay 101 form a double pole double throw switch with both pairs of contacts controlling circuits energizing switch motor 61. Upon energization of the solenoid of switch 101, which is normally spring-biased upwardly, the heating and cooling circuits including the middle contacts of relay 101 and thermostat 21 are opened and the defrost cycle control circuit including the lower contacts of relay 101 completed so that the motor 61 is energized. Upon a 180° rotation thereof the switchover valves are moved to their cooling cycle positions so that the flow of refrigerant through the refrigeration system is reversed with the outdoor coil 9 receiving hot compressed refrigerant from the compressor means. During the defrosting operation heat stored in the heat storage means 18 is absorbed by the refrigerant flowing from the indoor coil 1 and liberated in the colder outdoor coil 9. This stored heat greatly increases the rate of frost removal from coil 9, so that the defrosting operation can be completed before there is any substantial heat loss from the conditioned space.

During the defrost operation the circuit which energizes the fan motors 4 and 16 during the normal cooling or heating operations is broken by opening of the switch comprising the upper contacts of the defrost relay 101. By de-energizing these circuits when the system is operating on the defrost cycle, the possibility of substantial heat loss from the structure being conditioned by the indoor coil 1 is substantially reduced. Also with the indoor fan turned off, there is very little heat transfer by the indoor coil 1 and the evaporation of the refrigerant takes place in the storage tank coil 10. By placing the feeler bulb 51 in contact with the line 50 leading from coil 10 to the compressor instead of line 27 connecting coil 10 and indoor coil 1, it effectively controls the flow of refrigerant to the low pressure side of the system during operation of the system and the cooling cycle as well as the defrosting cycle. If the feeler bulb were in contact with line 27 ahead of coil 10, the cooling operation would be properly controlled but during defrost, the action of the bulb in trying to maintain a certain amount of superheat after the evaporator, would prevent any liquid refrigerant from passing to the storage tank. In addition the de-energization of the fan motor 16 stops the flow of cold outdoor air over the outdoor coil 9 so that the outdoor air does not interfere with the removal of the ice or frost from the coil 9.

As the frost is removed from the outdoor coil by the heated refrigerant, the temperature and pressure of the refrigerant in the coil outlet gradually increase. The termination of the defrosting action may be effected in response to an increase in either condition. In the modification shown temperature responsive means are employed to sense the defrosted condition. Termination of the defrosting cycle is under control of the bellows switch 110 having a temperature responsive feeler bulb 112 in heat exchange relationship with the outlet conduit from the outdoor coil 9. When the temperature of the outgoing refrigerant indicates that all of the frost has been removed, bellows switch 110 is opened thereby breaking the energizing circuit for the solenoid coil of relay 101. This relay then returns to its normal upper position whereby the circuit controlling the energization of fan motors 4 and 16 and the operation of the heat pump are again placed under control of the normal control circuits including the thermostat 21. Following the defrosting operation the thermostat switch 21 will in general call for a heating cycle so that the control mechanism including the motor driven switch unit will automatically effect the change-over of the operation of the refrigeration system to the heating cycle, thereby restoring normal heating operation of the heat pump.

As a further means of controlling the output of the heat pump under normal and varying load conditions, maens are provided for de-energizing one or more of the compressor motors 8a, 8b and 8c depending upon the change in the load on the refrigeration system as indicated by a change in the compressor head pressure. This control means includes bellows switches 114 and 115 respectively placed in the energizing circuits for the compressor motors 8a and 8b, specifically in lines 82a and 82b. These bellows switches are adapted to open at different increases in the head pressure and to be closed under normal head pressure conditions. For example, after a given predetermined increase in the head pressure above normal operating pressure, bellows switch 114 operates to de-energize the circuit including compressor motor 8a and to drop this compressor from the refrigeration system. If the head pressure continues to increase to a second higher predetermined value the bellows switch 115 operates to open the circuit energizing compressor motor 8b whereby the second compressor 7b is dropped from the refrigeration compressor means. The system then continues to operate with only the single compressor 7c until such time as the head pressure drops to effect the addition of first compressor 7b and then compressor 7a to the compressor means.

From the foregoing it will be seen that a simple and effective means has been provided for defrosting the outdoor coil of the heat pump including means for storing heat during the operation of the pump on the heating cycle in such a manner that the stored heat is automatically available during the defrosting operation to melt the frost on the outdoor coil. Means have also been provided for initiating the defrost cycle in response to the frosted condition of the outdoor coil and to continue the defrosting operation so long as any frost remains on the coil. After the defrosting operation has been completed as indicated by the fact that the refrigerant leaving the outdoor coil has reached a specified saturation temperature, means responsive to this temperature or corresponding pressure provided for automatically stopping the defrost cycle and returning the operation of the heat pump to the heating cycle.

Although the invention has been described in connection with a specific form of automatic electrical control circuits, other control arrangements will occur to those skilled in the art and it is therefore intended by the appended claims to cover all modifications within the spirit and scope of the invention.

What I claim as new and desire to secure by Letters Patent of the United States is:

1. A heat pump comprising a reverse cycle refrigeration system including a compressor, an indoor heat exchanger, a heat transfer coil, and an outdoor heat exchanger, and a heat storage medium, said coil being in heat exchange relationship with said medium, means connecting said compressor, said indoor heat exchanger, said heat transfer coil and said outdoor heat exchanger in closed series connection for flow of refrigerant through said system with said outdoor heat exchanger functioning as an evaporator, and means responsive to a frost condition on said outdoor heat exchange for connecting said compressor, said outdoor heat exchanger, said indoor heat exchanger and said heat transfer coil in closed series connection for flow of refrigerant through said system whereby said outdoor heat exchanger receives hot compressed refrigerant for defrosting thereof.

2. A heat pump comprising a reverse cycle refrigeration system including a compressor, an indoor heat exchanger, a heat transfer coil, and an outdoor heat exchanger, and a heat storage medium, said coil being in heat exchange relationship with said medium, means connecting said compressor, said indoor heat exchanger, said heat transfer coil and said outdoor heat exchanger in closed series connection for flow of refrigerant through said system with said outdoor heat exchanger functioning as an evaporator, and means responsive to a frost condition on the outdoor coil for connecting said compressor, said outdoor heat exchanger, said indoor heat exchanger and said heat transfer coil in closed series connection for flow of refrigerant through said system whereby said outdoor heat exchanger will function as a condenser for defrosting thereof.

3. A heat pump comprising a reverse cycle refrigeration system including a compressor, an indoor heat exchanger, a heat transfer coil, a subcooler coil, an outdoor heat exchanger, and a heat storage medium, said heat transfer coil being in heat exchange relationship with said medium, means for circulating indoor air over said subcooler and said indoor heat exchanger, means connecting said compressor, said indoor heat exchanger, said heat transfer coil, said subcooler coil and said outdoor heat exchanger in closed series connection for flow of refrigerant through said system with said outdoor heat exchanger functioning as an evaporator, and automatically controlled means for connecting said compressor, said outdoor heat exchanger, said subcooler coil, and said indoor heat exchanger and said heat transfer coil in closed series connection for flow of refrigerant through said system for defrosting said outdoor heat exchanger.

4. A heat pump comprising a reverse cycle refrigeration system including a compressor, an indoor heat exchanger, a heat storage means including a heat transfer coil and a heat storage medium in contact therewith, a subcooler coil and an outdoor heat exchanger, means for passing air to be conditioned over said subcooler coil and said indoor heat exchanger, means for connecting said compressor, indoor heat exchanger, heat transfer coil, subcooler coil, and outdoor heat exchanger in series to form a closed circuit for the flow of refrigerant during operation of said pump on the heating cycle, and means for connecting said compressor, outside heat exchanger, subcooler coil, indoor heat exchanger and heat transfer coil in series to form a second closed circuit in which the refrigerant heated by said heat storage medium and said compressor is conducted directly to said outdoor heat exchanger for the defrosting thereof.

5. A heat pump comprising a reverse cycle refrigeration system including a compressor, an indoor heat exchanger, a heat storage means including a heat transfer coil and a heat storage medium in contact therewith, a subcooler coil and an outdoor heat exchanger, means for passing air to be conditioned over said subcooler coil and said indoor heat exchanger, means for connecting said compressor, indoor heat exchanger, heat transfer coil, subcooler coil, and outdoor heat exchanger in series to form a first closed circuit for the flow of refrigerant during operation of said pump on the heating cycle, and means for connecting said compressor, outdoor heat exchanger, subcooler coil, indoor heat exchanger and heat transfer coil in series to form a second closed circuit for the flow of refrigerant during operation of said pump on a defrosting cycle, valve means for changing the flow of refrigerant from one circuit to the other and means responsive to a frost condition on said outdoor exchanger for controlling the operation of said valve means.

6. A heat pump comprising a reverse cycle refrigeration system including a compressor, an indoor heat exchanger, a heat storage means including a heat transfer coil and a heat storage medium in contact therewith, a subcooler coil and an outdoor heat exchanger, blower means for passing air to be conditioned over said subcooler coil and then over said indoor heat exchanger, blower means for passing outdoor air over said outdoor coil and electrically operated changeover valve means for connecting said compressor, indoor heat exchanger, heat transfer coil, subcooler coil, and outdoor heat exchanger in series to form a first closed refrigerant circuit for the flow of refrigerant during operation of said pump on the heating cycle and for connecting said compressor, outdoor coil, subcooler coil, indoor coil, and heat transfer coil in series to form a second closed refrigerant circuit for the flow of refrigerant during operation of said pump on the defrosting and cooling cycle, an electrical control circuit for controlling the operation of the changeover valve means including thermostatically operated switch means responsive to the temperaure of the air to be conditioned, means for sensing a frosted condition of the outdoor evaporator, and an electrical defrosting control circuit including switch means operated by said sensing means for shifting the said valve means for operation of said pump on a defrost cycle.

7. A heat pump comprising a reverse cycle refrigeration system including a compressor, an indoor heat exchanger, a heat storage means including a heat transfer coil and a heat storage medium in contact therewith, a subcooler coil and an outdoor heat exchanger, blower means for passing air to be conditioned over said subcooler coil and then over said indoor heat exchanger, blower means for passing outdoor air over said outdoor coil and electrically operated change-over valve means for connecting said compressor, indoor heat exchanger, heat transfer coil, subcooler coil, and outdoor heat exchanger in series to form a first closed refrigerant circuit for the flow of refrigerant during operation of said pump on the heating cycle and for connecting said compressor, outdoor coil, subcooler coil, indoor coil and heat transfer coil in series to form a second closed refrigerant circuit for the flow of refrigerant during operation of said pump on the defrosting and cooling cycle, electrical control circuits for controlling the operation of said compressor, said blower means and said change-over valve means comprising temperature responsive switch means responsive to the temperature of the air to be conditioned, a normal control circuit including said temperature responsive switch means for controlling the operation of said refrigeration system on the heating and cooling cycles, means for sensing the accumulation of frost on said outdoor coil, and a defrost control circuit including switch means operated by said sensing means for deenergizing said normal control circuit and effecting operation of said system on a defrost cycle.

8. A heat pump comprising a reverse cycle refrigeration system including a compressor, an indoor heat exchanger, a heat storage means including a heat transdfer coil and a heat storage medium in contact therewith, a subcooler coil and an outdoor heat exchanger, blower means for passing air to be conditioned over said subcooler coil and then over said indoor heat exchanger, blower means for passing outdoor air over said outdoor coil and electrically operated change-over valve means for connecting said compressor, indoor heat exchanger, heat transfer coil, subcooler coil, and outdoor heat exchanger in series to form a first closed refrigerant circuit for the flow of refrigerant during operation of said pump on the heating cycle and for connecting said compressor, outdoor coil, subcooler coil, indoor coil and heat transfer coil in series to form a second closed refrigerant circuit for the flow of refrigerant during operation of said pump on the defrosting and cooling cycle, electrical control circuits for controlling the operation of said compressor, said blower means and said change-over valve means comprising temperature responsive switch means responsive to the temperature of the air to be conditioned, a normal control circuit including said temperature responsive switch means for controlling the operation of said refrigeration system on the heating and cooling cycles, means for sensing the accumulation of frost on said outdoor coil, and a defrost control circuit including switch means operated by said sensing means for deenergizing said normal control circuit and effecting operation of said system on a defrost cycle, and switch means responsive to the defrosted condition of said outdoor coil for de-energizing said defrost control circuit and energizing said normal control circuit.

9. A heat pump comprising a reverse cycle refrigeration system including a compressor, an indoor heat exchanger, a heat storage means including a heat transfer coil and a heat storage medium in contact therewith, a subcooler coil and an outdoor heat exchanger, blower means for passing air to be conditioned over said subcooler coil and then over said indoor heat exchanger, blower means for passing outdoor air over said outdoor coil and electrically operated change-over valve means for connecting said compressor, indoor heat exchanger, heat transfer coil, subcooler coil, and outdoor heat exchanger in series to form a first closed refrigerant circuit for the flow of refrigerant during operation of said pump on the heating cycle and for connecting said compressor, outdoor coil, subcooler coil, indoor coil and heat transfer coil in series to form a second closed refrigerant circuit for the flow of refrigerant during operation of said pump on the defrosting and cooling cycle, means responsive to a condition of the refrigerant leaving said heat transfer coil for controlling the flow of refrigerant to said indoor coil, electrical control circuits for controlling the operation of said compressor, said blower means and said change-over valve means comprising temperature responsive switch means responsive to the temperature of the air to be conditioned, a normal control circuit including said temperature responsive switch means for energizing said compressor, said blower means on the heating and cooling cycles and for operating said valve means upon a call by said thermostat for a change in operation of said system from one cycle to the other, means for sensing the accumulation of frost on said outdoor coil, a defrost control circuit including switch means operated by said sensing means for de-energizing said normal control circuit and independently energizing said compressor and said change-over valve means, for operation of the system on a defrost cycle and switch means responsive to the defrosted condition of said outdoor coil for de-energizing said defrost control circuit and energizing said normal control circuit.

References Cited in the file of this patent

UNITED STATES PATENTS

| | | |
|---|---|---|
| 2,135,285 | Gibson | Nov. 1, 1938 |
| 2,143,687 | Crago | Jan. 10, 1939 |
| 2,440,146 | Kramer | Apr. 20, 1948 |
| 2,474,304 | Clancy | June 28, 1949 |
| 2,611,587 | Boling | Sept. 23, 1952 |
| 2,619,326 | McLenegan | Nov. 25, 1952 |
| 2,677,243 | Telkes | May 4, 1954 |

OTHER REFERENCES

Air Conditioning and Refrigeration News, January 4, 1954; pp. 26 and 27 relied on.

Heating and Ventilation, July 1945; pages 55 to 61 relied on.